(12) United States Patent
Yamauchi

(10) Patent No.: US 7,859,531 B2
(45) Date of Patent: Dec. 28, 2010

(54) METHOD AND APPARATUS FOR THREE-DIMENSIONAL GRAPHICS, AND COMPUTER PRODUCT

(75) Inventor: Hideaki Yamauchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/129,420

(22) Filed: May 29, 2008

(65) Prior Publication Data

US 2008/0225051 A1 Sep. 18, 2008

Related U.S. Application Data

(63) Continuation of application No. PCT/JP2005/022000, filed on Nov. 30, 2005.

(51) Int. Cl.
*G06T 15/00* (2006.01)
(52) U.S. Cl. .................. 345/426; 345/419; 345/420; 345/422; 345/428
(58) Field of Classification Search .............. 345/419, 345/420, 421, 422, 426, 428
See application file for complete search history.

(56) References Cited

U.S. PATENT DOCUMENTS

| | | | | |
|---|---|---|---|---|
| 7,167,181 B2* | 1/2007 | Duluk et al. | ............. | 345/506 |
| 7,256,781 B2* | 8/2007 | Shioya | ............. | 345/426 |
| 2004/0061700 A1 | 4/2004 | Shioya | | |
| 2004/0130552 A1 | 7/2004 | Duluk, Jr. et al. | | |

FOREIGN PATENT DOCUMENTS

| | | | |
|---|---|---|---|
| JP | 4-149681 A | 5/1992 |
| JP | 2001-266177 A | 9/2001 |
| JP | 2002-298162 A | 10/2002 |
| JP | 2004-271901 A | 9/2004 |
| JP | 2005-056075 A | 3/2005 |

OTHER PUBLICATIONS

Quo, Phong Shading and Gouraud Shading, Cornell University, Computer Science Project, 1996, pp. 1-14.*
Oliver Klar: "Simulation besonderer Beleuchtungseffekte mit Hilfe von Vertex—und Fragmentshadern"; student paper; University Koblenz-Landau; Jun. 2004; p. 1-62; eHB.

* cited by examiner

*Primary Examiner*—Phu Nguyen
(74) *Attorney, Agent, or Firm*—Arent Fox LLP

(57) ABSTRACT

A graphic apparatus that draws an object three-dimensionally using a level plane and a height-axis perpendicular to the level plane includes a receiving unit, a calculating unit, and a drawing unit. The receiving unit receives vertex data identifying a position of a top surface of the object on the level plane. The calculating unit calculates a modulation coefficient of luminance for the top surface based on a normal vector for the top surface and a light-source vector indicating a direction of a light source on the level plane. The drawing unit draws the top surface using the vertex data and the modulation coefficient, and a top surface of another object using the modulation coefficient.

11 Claims, 11 Drawing Sheets

METHOD AND APPARATUS FOR THREE-DIMENSIONAL GRAPHICS, AND COMPUTER PRODUCT

BACKGROUND

1. Field

The embodiments discussed herein are directed to a technology of lighting processing in three-dimensional graphics.

2. Description of the Related Art

Various proposals have conventionally made for three-dimensional graphics. For example, in a conventional technology disclosed in Japanese Patent Application Laid-Open Publication No. 2001-266177, the floor number of a building on a two-dimensional map is determined by probability calculations using the two-dimensional map and information concerning at least one of the material, the main use and the floor area of the building included in the accompanying building information to create a three-dimensional map.

In a conventional technology disclosed in Japanese Patent Application Laid-Open Publication No. 2002-298162, a three-dimensional model is generated in accordance with plural three-dimensional model patterns prepared in accordance with the information concerning the bottom shape and the height of a building in advance to display a three-dimensional view with a small computer system. In a conventional technology disclosed in Japanese Patent Application Laid-Open Publication No. 2005-56075, original three-dimensional map data are processed by dividing the data into scene graph data where the data structure of a three-dimensional map is expressed as a tree structure and drawing data for drawing objects included in the three-dimensional map, and a display area is specified by referring to the scene graph to execute display processing.

However, in the conventional technologies of above patent documents, even if an object to be drawn has an obviously simple shape like a typical building, since faithful calculation processing equivalent to that for a complicated arbitrary shape is executed when a graphic LSI performs lighting calculations, it is problematic that the calculation processing is slowed down. Although a normal vector must be applied to a piece of vertex information to perform the lighting calculations with the graphic LSI, a normal vector must be calculated each time from vertex coordinates in the case of application to which data such as a two-dimensional map are only input, which delays the processing. If a CPU performs the lighting calculations, it is problematic that the load of the CPU is excessively increased.

If the lighting calculations are sequentially executed as above, it is problematic that the performance is seriously reduced when needless calculations are included. On the other hand, although a system capable of concurrently performing the lighting calculations is less affected by the performance reduction due to needless calculations, it is problematic that the performance is comprehensively reduced since needless data transfer is generated. It is also problematic that wasteful power consumption is increased by needless lighting calculations.

SUMMARY

It is an aspect of the embodiments discussed herein to provide a graphic apparatus that draws an object three-dimensionally using a level plane and a height-axis perpendicular to the level plane, including: a receiving unit that receives vertex data identifying a position of a top surface of the object on the level plane; a calculating unit that calculates a modulation coefficient of luminance for the top surface based on a normal vector for the top surface and a light-source vector indicating a direction of a light source on the level plane; and a drawing unit that draws the top surface using the vertex data and the modulation coefficient, and a top surface of another object using the modulation coefficient.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below. The present invention is not limited by these embodiments.

Figure 1:
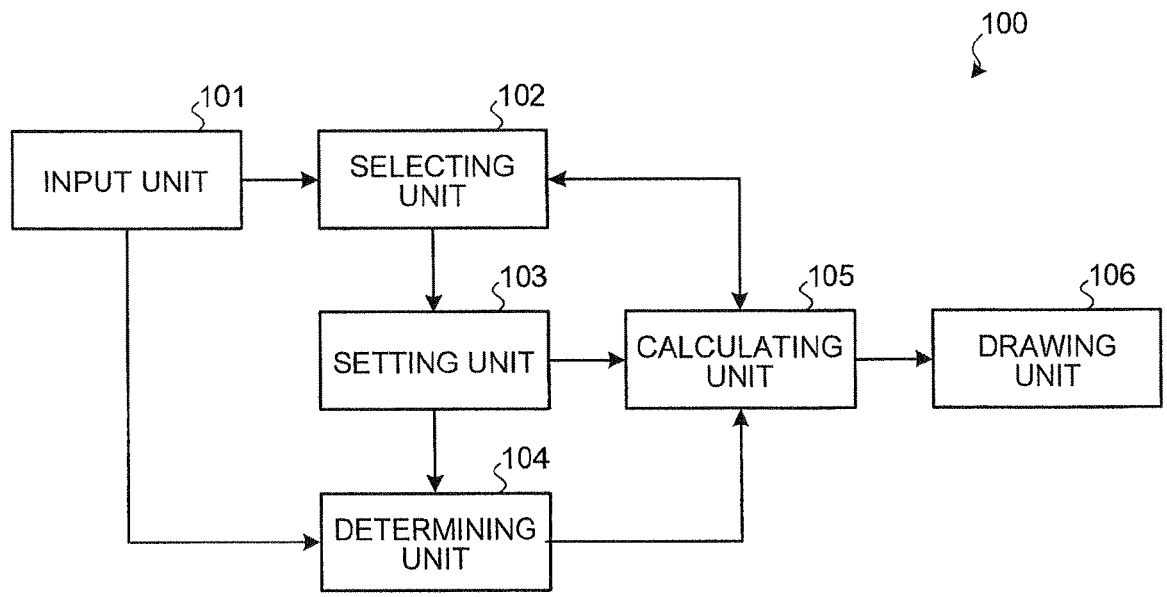
FIG. 1 is a block diagram of a functional configuration of a three-dimensional graphic apparatus according to an embodiment.

A functional configuration of a three-dimensional graphic apparatus according to an embodiment is explained. FIG. 1 is a block diagram of a functional configuration of the three-dimensional graphic apparatus according to the embodiment.

As shown in FIG. 1, a three-dimensional graphic apparatus 100 draws a three-dimensional object three-dimensionally expressed by an XY plane consisting of X-axis and Y-axis orthogonal to each other and an H-axis representing a height from the XY plane. The XY plane corresponds to a level plane in a three-dimensional virtual space, and the H-axis corresponds to a height direction in the three-dimensional virtual space.

The three-dimensional graphic apparatus 100 includes an input unit 101, a selecting unit 102, a setting unit 103, a determining unit 104, a calculating unit 105, and a drawing unit 106. The input unit 101 receives an input of two-dimensional vertex data. A three-dimensional object refers to an establishment such as a building expressed stereoscopically in the three-dimensional virtual space, for example.

The two-dimensional vertex data include plural XY coordinate values specifying positions on the XY plane of the top surface of the three-dimensional object, and do not include a coordinate value in the H-direction. The two-dimensional vertex data are a successive data stream continuously input to the input unit 101, for example.

Figure 2:
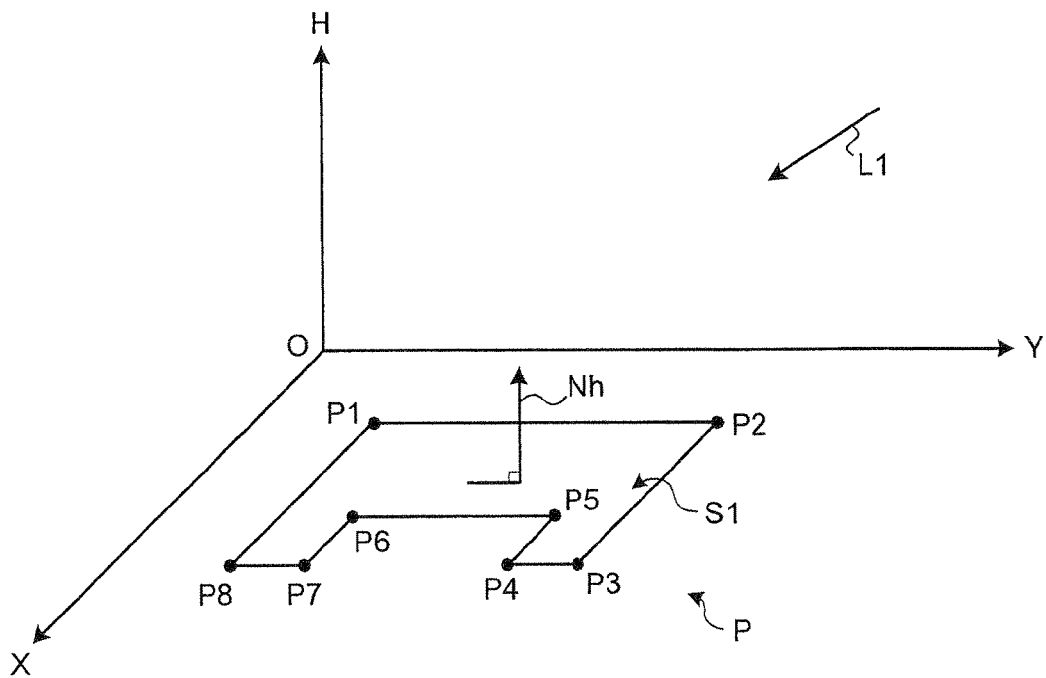
FIG. 2 is an explanatory diagram of a two-dimensional vertex data in a three-dimensional virtual space.

FIG. 2 is an explanatory diagram of the two-dimensional vertex data in the three-dimensional virtual space. As shown in FIG. 2, two-dimensional vertex data P include vertex data Pi (i=1 to n, n=8 in this example). XY coordinates of the vertex data Pi are (xi, yi). A coordinate value of the two-dimensional vertex data P is "0" in the H-direction, and the vertex data Pi are located on the XY plane.

A plane S1 formed by the vertex data Pi is the top surface of the three-dimensional object when push-out processing is executed in the H-direction. A reference numeral Nh shown in FIG. 2 denotes a normal vector of the plane S1. A vector component (x, y, h) of the normal vector Nh is a fixed value (0, 0, Nh)=(0, 0, 1). A reference numeral L1 denotes a light source vector indicating an irradiation direction from a light source.

As shown in FIG. 1, the selecting unit 102 switches a mode of drawing the top surface of the three-dimensional object (top-surface drawing mode) and a mode of drawing side surfaces of the three-dimensional object (side-surface drawing mode) to select either of the drawing modes. If the top-surface drawing mode is selected, the two-dimensional vertex data P are output to the calculating unit 105. On the other hand, if the side-surface drawing mode is selected, the two-dimensional vertex data P are output to the setting unit 103.

The selecting unit 102 switches the drawing modes in accordance with an instruction from the calculating unit 105. For example, the top-surface drawing mode is set by default, and when the two-dimensional vertex data P are input, the top-surface drawing mode is switched to the side-surface drawing mode if a luminance modulation coefficient Ku is calculated for the top surface by the calculating unit 105 explained hereinafter.

The setting unit 103, the determining unit 104, the calculating unit 105, and the drawing unit 106 are briefly explained here. The setting unit 103 sets two-dimensional normal vectors on the XY plane for the side surfaces of the three-dimensional object. The determining unit 104 determines whether the side surfaces of the three-dimensional object are opposed in the two-dimensional direction of the sight line. The calculating unit 105 calculates the luminance modulation coefficient for the top surface or the side surfaces of the three-dimensional object. The drawing unit 106 draws the three-dimensional object by executing the processing of pushing out the two-dimensional vertex data P in the H-direction using H-direction height data, the lighting processing using the modulation coefficient, and the projective transformation.

A functional configuration is explained here for the case that the top-surface drawing mode is selected by the selecting unit 102. If the top-surface drawing mode is selected, the lighting processing is executed for the top surface using the calculating unit 105 and the drawing unit 106 to draw the three-dimensional object.

Specifically, the calculating unit 105 calculates the luminance modulation coefficient Ku for the top surface based on the normal vector Nh for the top surface of the three-dimensional object and the light source vector L1 indicating a direction of a light source. The luminance modulation coefficient Ku for the top surface is an inner product value of the normal vector Nh and the light source vector L1. Specifically, the light source vector L1 is normalized to calculate an inner product value of the normal vector Nh and the normalized light source vector L1. In other words, assuming that the vector component (x, y, h) of the normalized light source vector L1 is (Lx, Ly, Lh), the luminance modulation coefficient Ku for the top surface is expressed by the following equation (1).

$$Ku = Lh \times Nh \quad (1)$$

The drawing unit 106 draws the top surface using the two-dimensional vertex data P and the modulation coefficient Ku calculated by the calculating unit 105, and top surfaces of three-dimensional objects other than the three-dimensional object using the modulation coefficient Ku. In other words, the drawing unit 106 applies the same modulation coefficient Ku to each of the three-dimensional objects.

Figure 3:
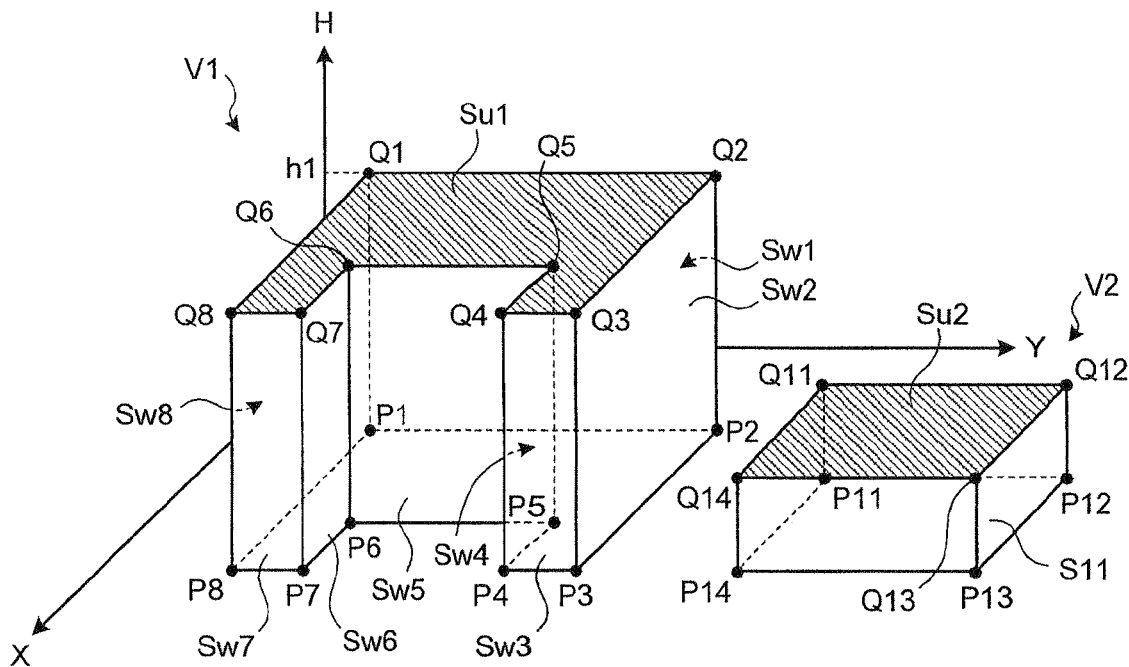
FIG. 3 is an explanatory diagram of three-dimensional objects drawn by a drawing unit 106.

FIG. 3 is an explanatory diagram of three-dimensional objects drawn by the drawing unit 106. As shown in FIG. 3, a three-dimensional object V1 is an object drawn by the processing of pushing out the two-dimensional vertex data Pi (i=1 to n, n=8 in this example) in the H-direction. Assuming that a height of the three-dimensional object V1 in the H-direction is h1, a coordinate value of vertex data Qi (i=1 to n, n=8 in this example) constituting a top surface Su1 is Qi=(xi, yi, h1).

Another three-dimensional object V2 other than the three-dimensional object V1 is an object drawn by the processing of pushing out, in the H-direction, a plane S11 formed with new two-dimensional vertex data P11 to P14 input through the input unit 101. A top surface Su2 of the three-dimensional object V2 is formed with vertex data Q11 to Q14. The drawing unit 106 applies the common modulation coefficient Ku to the top surface Su1 and the top surface Su2 to calculate a lighting color Cu1 of the top surface Su1 and a lighting color Cu2 of the top surface Su2.

Specifically, assuming that (Ru1, Gu1, Bu1) is the color of the top surface Su1 at the time of the maximum luminance not dependent on the light source (Ru1, Gu1, and Bu1 represent red, green, and blue, respectively), when using the light source vector L1, the lighting color Cu1 of the top surface Su1 is expressed by the following equation (2).

$$Cu1 = (Ku \times Ru1, Ku \times Gu1, Ku \times Bu1) \quad (2)$$

Similarly, assuming that (Ru2, Gu2, Bu2) is the color of the top surface Su2 at the time of the maximum luminance not dependent on the light source (Ru2, Gu2, and Bu2 represent red, green, and blue, respectively), when using the light source vector L1, the lighting color CU2 of the top surface Su2 is expressed by the following equation (3).

$$Cu2 = (Ku \times Ru2, Ku \times Gu2, Ku \times Bu2) \quad (3)$$

The top surfaces Su1 and Su2 can be drawn using the calculated lighting colors Cu1 and Cu2. Since the top surface Su2 of the other three-dimensional object V2 can be drawn if the modulation coefficient Ku has been calculated for the arbitrary three-dimensional object V1 in the top-surface drawing mode as above, the lighting calculation can be accelerated. Particularly, since establishments such as buildings are expressed by plural three-dimensional objects in three-dimensional map data, the load of the three-dimensional graphic apparatus 100 is more reduced as the number of three-dimensional objects is greater.

A functional configuration is explained for the case that the side-surface drawing mode is selected by the selecting unit 102. If the side-surface drawing mode is selected, the lighting processing is executed for the side surfaces using the setting unit 103, the determining unit 104, the calculating unit 105, and the drawing unit 106 to draw the three-dimensional object.

First, the setting unit 103 sets two-dimensional normal vectors on the XY plane for the side surfaces of the three-dimensional object based on the two-dimensional vertex data P. Specifically, for example, upon or before drawing the three-dimensional object V1 shown in FIG. 3, two-dimensional normal vectors are set.

Figure 4:
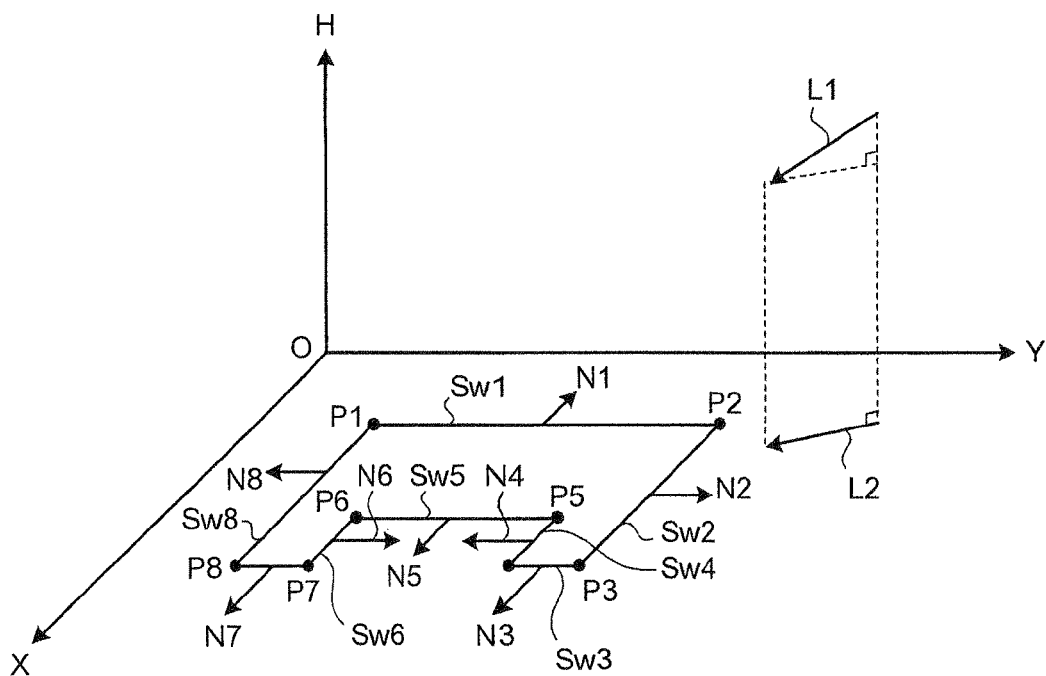
FIG. 4 is an explanatory diagram of two-dimensional normal vectors on the XY plane with respect to side surfaces of a three-dimensional object.

FIG. 4 is an explanatory diagram of the two-dimensional normal vectors on the XY plane with respect to the side surfaces Sw1 to Sw8 of the three-dimensional object V1. As shown in FIG. 4, for side surfaces Swi (i=1 to n, n=8 in this example) shown in FIG. 3, two-dimensional normal vectors Ni (i=1 to n, n=8 in this example) are set that are perpendicular to sides swi (i=1 to n, n=8 in this example) constituting a plane S1 and on the XY plane, since the push-out processing in the H-direction is not executed.

A setting method of the two-dimensional normal vector Ni (i=1 to n, n=8 in this example) is explained. With respect to the two-dimensional normal vector Ni(Nix, Niy) of a side swi between successive vertex data Pi(xi, yi) and vertex data Pj(xj, yj) (j=i+1), when it is assumed that the left side of the vector (Xi, Yi) from the vertex data Pi to the vertex data Pj is the positive direction of the two-dimensional normal vector Ni, the following equations (4) to (7) are satisfied.

$$Xi = xj - xi \quad (4)$$

$$Yi = yj - yi \quad (5)$$

$$Nix = Xi \cos 90° + Yi \sin 90° = Yi = yj - yi \quad (6)$$

$$Niy = -Xi \sin 90° + Yi \cos 90° = -Xi = xi - xj \quad (7)$$

The setting unit 103 projects the three-dimensional light source vector L1 onto the XY plane to set a light source vector L2 indicating the two-dimensional direction of the light source on the XY plane. The vector component (x, y) of the light source vector L2 is defined as (Lx, Ly).

The calculating unit 105 calculates the luminance modulation coefficients for the side surfaces Sw1 to Sw8 based on the two-dimensional normal vectors N1 to N8 set by the setting unit 103 and the light source vector L2 indicating the two-dimensional direction of the light source on the XY plane. The luminance modulation coefficient for the side surface Swi is an inner product value of the normal vector Ni and the light source vector L2. Specifically, the light source vector L2 is normalized to calculate the inner product value of the normal vector Ni and the normalized light source vector L2.

In other words, assuming that the vector component (x, y) of the normalized light source vector L2 is (Lx, Ly), a luminance modulation coefficient Kwi for the side surface Swi (i=1 to n, n=8 in this example) is expressed by the following equation (8).

$$Kwi = Lx \times Nix + Ly \times Niy \quad (8)$$

The drawing unit 106 draws the side surface Swi using the two-dimensional vertex data P and the modulation coefficient Kwi calculated by the calculating unit 105. The drawing unit 106 applies the respective modulation coefficient Kwi to the side surface Swi to calculate a lighting color Cwi (i=1 to n, n=8 in this example) of the side surface Swi.

Specifically, assuming that (Rwi, Gwi, Bwi) is the color of the side surface Swi at the time of the maximum luminance not dependent on the light source (Rwi, Gwi, and Bwi represent red, green, and blue, respectively), when using the light source vector L2, the lighting color Cwi of the side surface Swi is expressed by the following equation (9).

$$Cwi = (Kwi \times Rwi, Kwi \times Gwi, Kwi \times Bwi) \quad (9)$$

Figure 5:
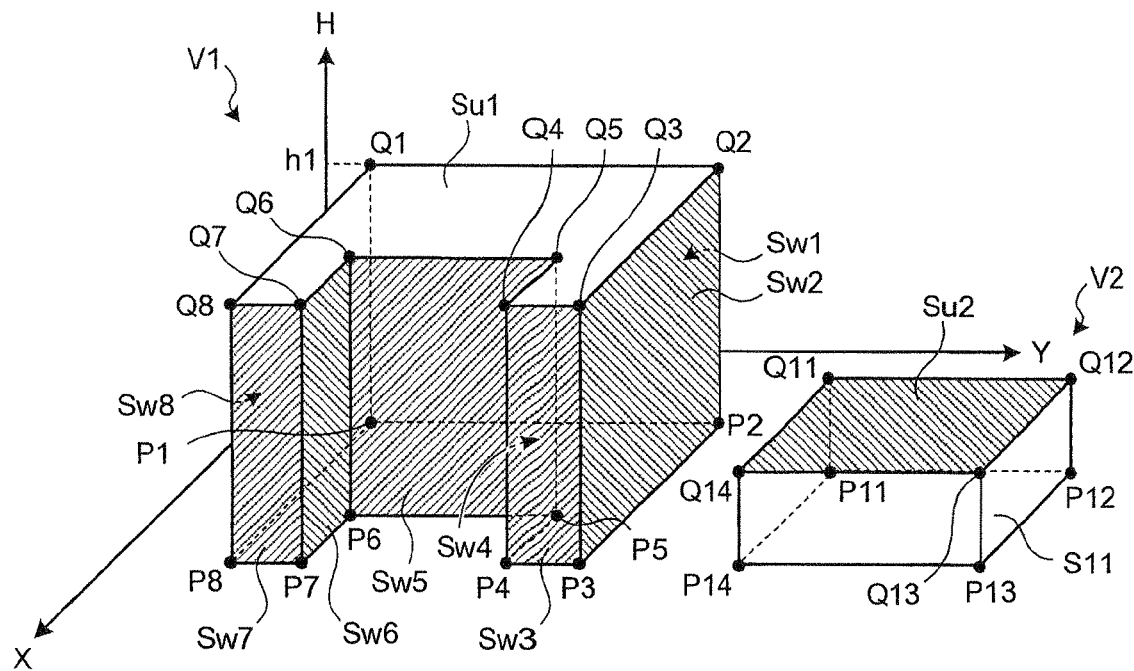
FIG. 5 is an explanatory diagram of the three-dimensional object drawn by using luminance modulation coefficients for side surfaces.

The side surface Swi can be drawn using the calculated lighting color Cwi. FIG. 5 is an explanatory diagram of the three-dimensional object V1 drawn by using the luminance modulation coefficient Kwi for the side surface Swi. Drawing in a particular case of the side-surface drawing mode is explained (the smoothing of the lighting processing and the direction setting of the two-dimensional normal vector).

The smoothing of the lighting processing is explained. The smoothing of the lighting processing is processing of using the same modulation coefficient for a ridge line shared by two side surfaces and performing successive interpolation with a modulation coefficient of a ridge line not shared by the two side surfaces to apply realistic lighting upon execution of the lighting processing of the two successive side surfaces at the time of drawing. This is particularly effective when a curved surface is approximately drawn with successive side surfaces.

Figure 6:
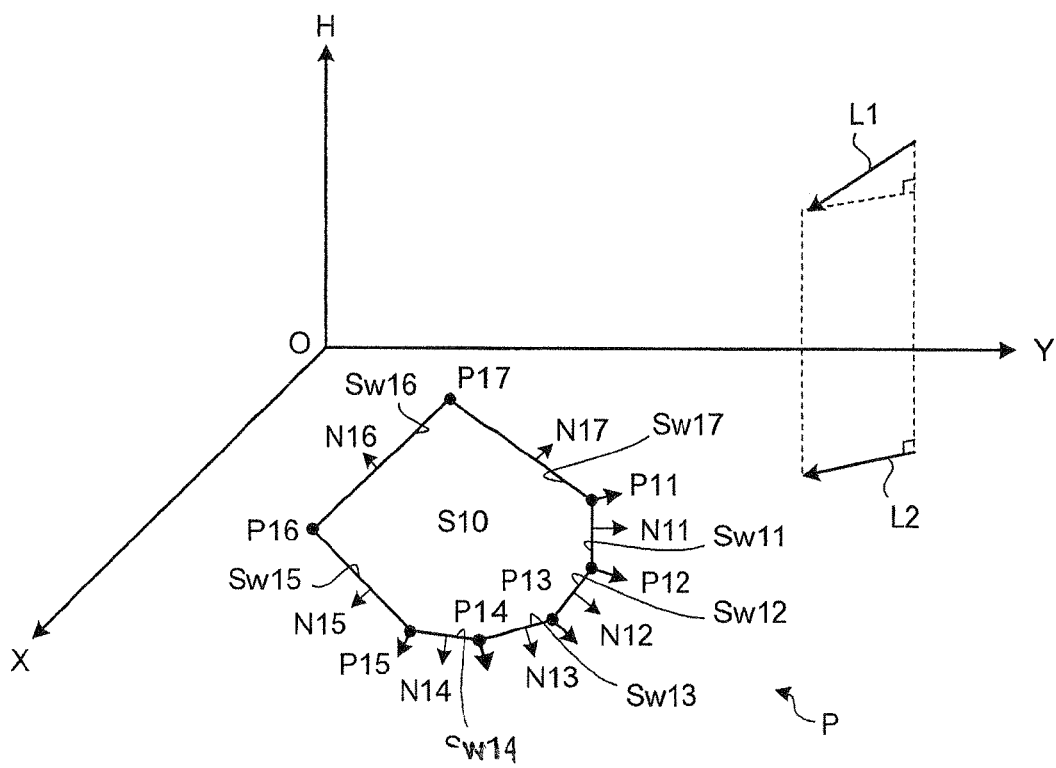
FIG. 6 is an explanatory diagram of another example of the two-dimensional vertex data in the three-dimensional virtual space.

FIG. 6 is an explanatory diagram of another example of the two-dimensional vertex data in the three-dimensional virtual space. As shown in FIG. 6, two-dimensional vertex data P include vertex data P11(x11, y11) to vertex data P17(x17, y17). A coordinate value of the two-dimensional vertex data P is "0" in the H-direction and the vertex data P11 to P17 are located on the XY plane.

The top surface of the three-dimensional object is drawn by executing the processing of pushing out, in the H-direction, a plane S10 formed by the vertex data P11(x11, y11) to the vertex data P17(x17, y17). Sides sw11 to sw17 are drawn as the side surfaces of the three-dimensional object by executing the processing of pushing out the plane S10 in the H-direction.

The setting unit 103 sets the two-dimensional normal vectors Ni (i=11 to 17) using the above equations (4) to (7). A curved surface can approximately be drawn by linking side surfaces with short widths on the XY plane, and in such a case, the lighting color of two successive side surfaces is drawn by successively interpolating the lighting colors of the vertices. In this case, the setting unit 103 sets an average normal vector of the two-dimensional normal vectors Ni of the two successive side surfaces for the vertices P11 to P15.

A method of setting an average normal vector Nij(Nxij, Nyij) of the two-dimensional normal vector Ni and the two-dimensional normal vector Nj (j=i+1) is explained. With regard to the two-dimensional normal vector Ni(Nix, Niy) of the side swi between successive vertex data Pi(xi, yi) and vertex data Pj(xj, yj), when it is assumed that the left side of the vector (Xi, Yi) from the vertex data Pi to the vertex data Pj is the positive direction of the two-dimensional normal vector Ni, the same result as the above equations (4) to (7) is obtained.

Similarly, with regard to the two-dimensional normal vector Nj(Njx, Njy) of the side swj between successive vertex data Pj(xj, yj) and vertex data Pk(xk, yk) (k=j+1), when it is assumed that the left side of the vector (Xj, Yj) from the vertex data Pj to the vertex data Pk is the positive direction of the two-dimensional normal vector Nj, a similar result as the above equations (4) to (7) is obtained.

$$Xj = xk - xj \quad (10)$$

$$Yj = yk - yj \quad (11)$$

$$Njx = Xj \cos 90° + Yj \sin 90° = Yj = yk - yj \quad (12)$$

$$Njy = -Xj \sin 90° + Yj \cos 90° = -Xj = xj - xk \quad (13)$$

Therefore, from the above equations (4) to (7) and (10) to (13), the vector component (Nxij, Nyij) of the average normal vector Nij can be expressed by the following equations (14) and (15).

$$Nxij = (Nix + Njx)/2 \quad (14)$$

$$Nyij = (Niy + Njy)/2 \quad (15)$$

The calculating unit 105 calculates the modulation coefficient for each of the vertices P11 to P15 using the average normal vector Nij, and the drawing unit 106 calculates the lighting color for drawing while successively interpolating the calculated modulation coefficient. A specific method of the successive interpolation may be a known method such as a so-called "gouraud shading". A drawn three-dimensional object is explained.

Figure 7:
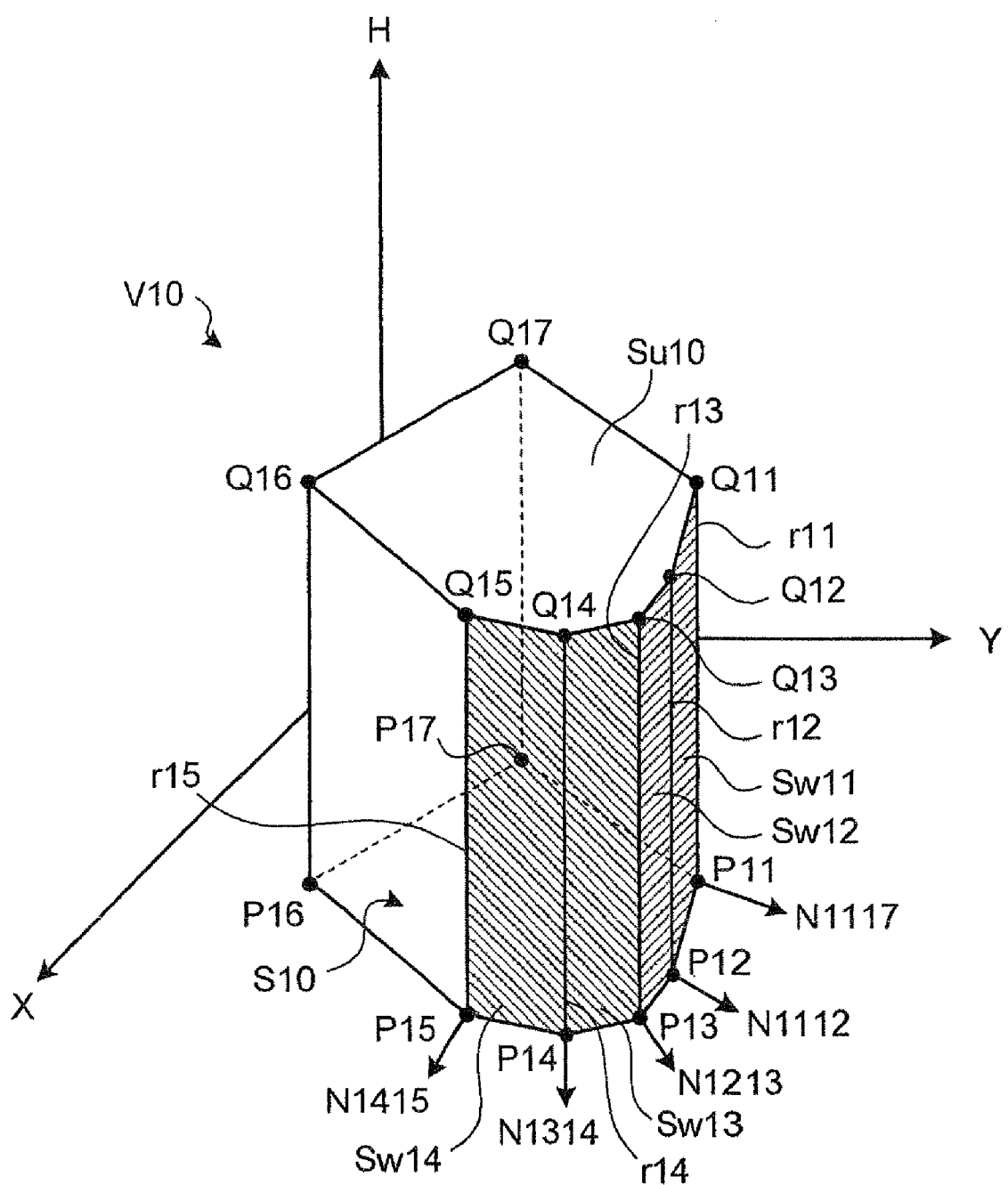
FIG. 7 is an explanatory diagram of an example of a three-dimensional object.

FIG. 7 is an explanatory diagram of an example of a three-dimensional object. A three-dimensional object V10 shown in FIG. 7 is formed as an object having a top surface Su10 consisting of vertex data Q11 to Q17 by pushing out the plane S10 consisting of the two-dimensional vertex data P11 to P17 in the H direction.

A side surface Sw11 corresponding to the side sw11 and a side surface Sw12 corresponding to the side sw12 are continued, and an average normal vector N1112 is a two-dimensional normal vector of a ridge line r12. Therefore, the side surface Sw11 and the side surface Sw12 have the same modulation coefficient on the ridge line r12.

Similarly, the side surface Sw12 corresponding to the side sw12 and a side surface Sw13 corresponding to the side sw13 are continued. The side surface Sw13 corresponding to the side sw13 and a side surface Sw14 corresponding to the side sw14 are continued. An average normal vector N1213 is a two-dimensional normal vector of a ridge line r13. An average normal vector N1314 is a two-dimensional normal vector of a ridge line r14.

Therefore, the side surface Sw12 and the side surface Sw13 have the same modulation coefficient on the ridge line r13, and the side surface Sw13 and the side surface Sw14 have the same modulation coefficient on the ridge line r14. An average normal vector N1415 is also obtained for a ridge line r15 between a side surface Sw14 and a side surface Sw15, and an average normal vector N1117 is also obtained for a ridge line r11 between the side surface Sw11 and a side surface Sw17. The lighting color acting as a reference of interpolation is obtained for each of the vertices P11 to P15 from the average normal vector calculated for each of the vertices P11 to P15. This enables the smoothing of the lighting colors, and the curved surfaces of the three-dimensional object can realistically be drawn with simple lighting-color calculation processing.

Direction setting of two-dimensional normal vectors is explained. The direction setting of two-dimensional normal vectors is categorized into a case that the arrangement order of the two-dimensional vertex data is defined clockwise (or counterclockwise) in advance, and a case that the arrangement order of the two-dimensional vertex data is not defined in advance.

Figure 8:
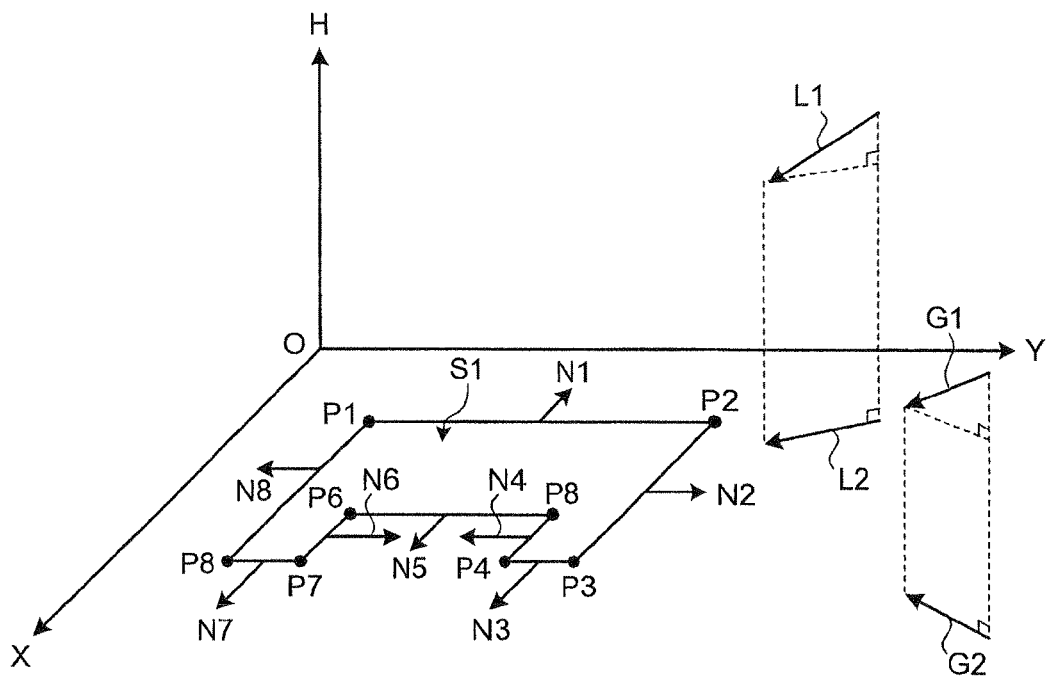
FIG. 8 is an explanatory diagram of two-dimensional vertex data having an arrangement order defined clockwise.

First, the case of the arrangement order of the two-dimensional vertex data defined clockwise (or counterclockwise) in advance is explained. FIG. 8 is an explanatory diagram of two-dimensional vertex data P1 to P8 having the arrangement order defined clockwise. As shown in FIG. 8, the two-dimensional vertex data P1 to P8 are a data stream input in the ascending order of the numbers.

In such a case, since the normal-line direction of the side swi of the plane S1 are always directed toward the left of line segments linking the vertices in the order of the numbers, an angle formed by the light source direction and the normal-line direction is uniquely determined. Therefore, by calculating an inner product of the light source vector L2 and the two-dimensional normal vector Ni, a modulation coefficient can be calculated for the luminance of the side surface formed by stretching the side swi of the plane S1 in the H-direction.

The setting unit 103 sets a two-dimensional sight-line direction vector G2, which is a sight-line direction vector G1 projected on the XY plane. In this case, the determining unit 104 determines whether a side surface is opposed to the two-dimensional direction of the sight line based on the sign of the inner product value of the two-dimensional normal vector Ni (i=1 to 8) for the side surface and the two-dimensional sight-line direction vector G2.

Only when the sign of the inner product value is negative, the side swi is opposed to the sight-line direction vector G2. Therefore, the drawing unit 106 can simply implement the omission of needless drawing by drawing a three-dimensional object using a hidden surface removal method (back-face culling method). Whether a wall surface is opposed to the sight-line direction can also be determined by only determining whether the subsequent vertex is located to the right or left of the preceding vertex on the screen without calculating the inner product value.

Figure 9:
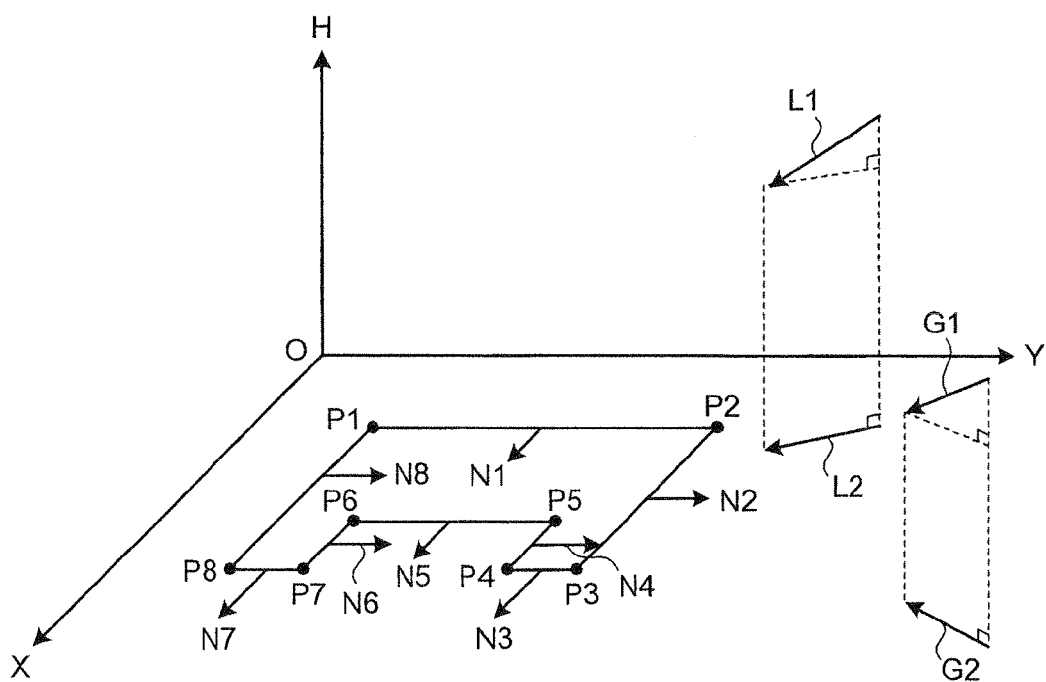
FIG. 9 is an explanatory diagram of the two-dimensional vertex data having the arrangement order not defined in advance.

The case of the arrangement order of the two-dimensional vertex data not defined in advance is explained. FIG. 9 is an explanatory diagram of the two-dimensional vertex data P1 to P8 having the arrangement order not defined in advance. As shown in FIG. 9, unless a closed curve is established by an input of the final vertex data (e.g., the vertex data P8), the inside and outside of the side swi, i.e., the front and back of the side surface Swi drawn by stretching the side swi in the H direction cannot be identified.

On the other hand, when it is waited until the plane S1 is closed since the number of the two-dimensional vertex data P is enormous or when the number of the two-dimensional vertex data P has no upper limit, a large amount of the two-dimensional vertex data P is retained in a temporary buffer, which is not practical. In such a case, the drawing unit 106 sets the two-dimensional normal vectors Ni with the assumption that all the two-dimensional normal vectors Ni are opposed to the sight-line direction vector G2, i.e., such that an angle θ formed by the two-dimensional normal vectors Ni and the sight-line direction vector G2 satisfies 90°<θ≦180°.

In this case, the luminance modulation coefficients are inaccurate for the side surfaces when the sides sw1, sw4, and sw8 corresponding to the two-dimensional normal vectors (N1, N4, and N8 of FIG. 9) handled in opposite directions of the normal-line directions of the two-dimensional normal vectors Ni are pushed out in the H-direction.

In this case, in combination with a hidden surface removal method (Z-buffer method), the hidden surface removal is performed for the side surfaces (Sw1, Sw4, and Sw8 of FIG. 5) of the sides sw1, sw4, and sw8 pushed out in the H-direction with the side surfaces (Sw2, Sw3, Sw5, Sw6, and Sw7 of FIG. 5) of the sides sw2, sw3, sw5, sw6, and sw7 pushed out in the H-direction. Therefore, accurate drawing can be performed as a result.

Figure 10:
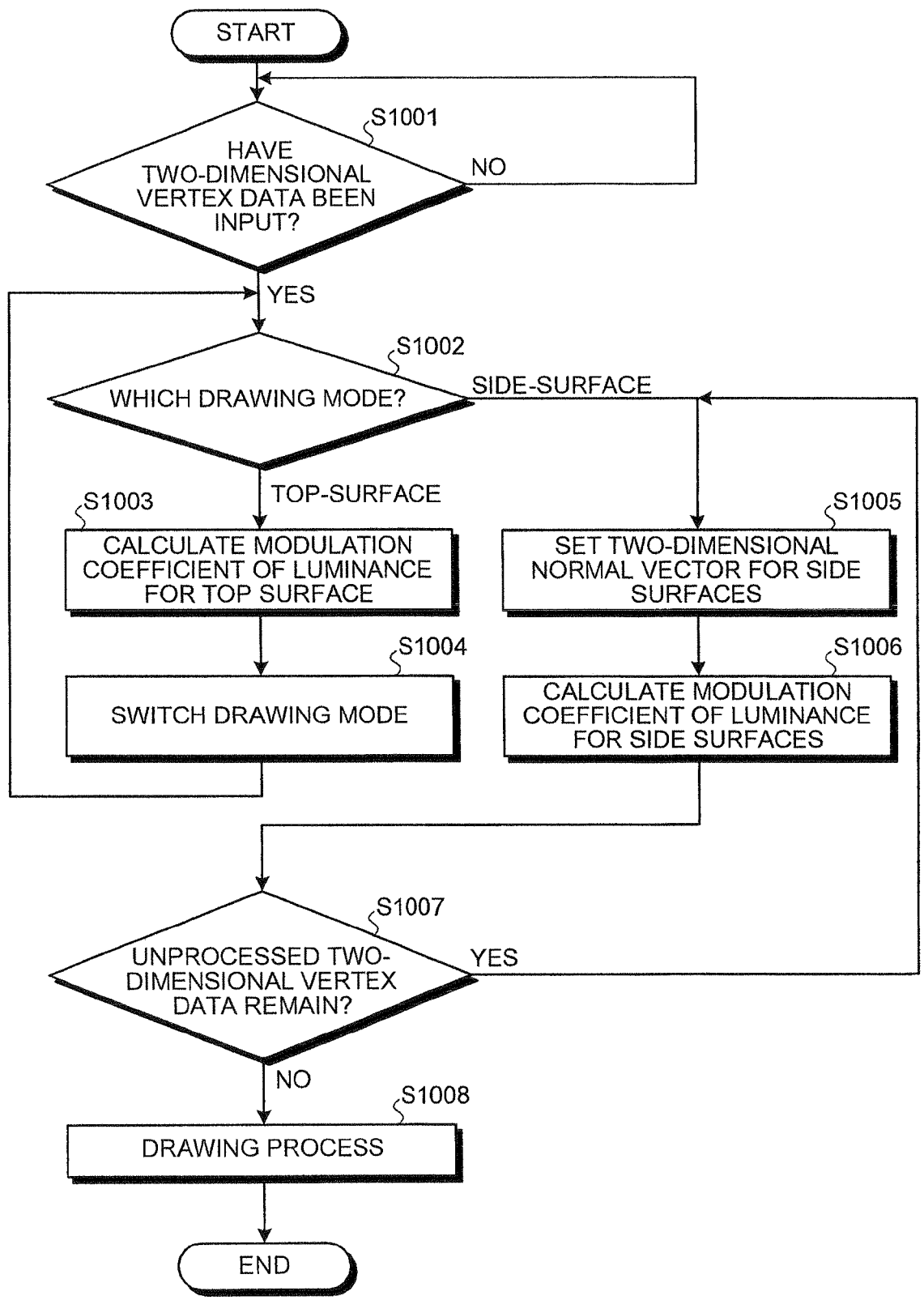
FIG. 10 is a flowchart of a three-dimensional graphic process performed by the three-dimensional graphic apparatus according to the embodiment.

A three-dimensional graphic process performed by the three-dimensional graphic apparatus 100 according to the embodiment is explained. FIG. 10 is a flowchart of the three-dimensional graphic process performed by the three-dimensional graphic apparatus 100 according to the embodiment. The selecting unit 102 selects the top-surface drawing mode by default. As shown in FIG. 10, first, the input unit 101 waits for an input of the two-dimensional vertex data P (step S1001: NO). When the two-dimensional vertex data have been input (step S1001: YES), if the drawing mode is the top-surface drawing mode (step S1002: TOP-SURFACE), the calculating unit 105 calculates the modulation coefficient Ku of the luminance for the top surface (step S1003).

The drawing mode of the selecting unit 102 is switched from the top-surface drawing mode to the side-surface drawing mode (step S1004) and the process returns to step S1002. On the other hand, if the drawing mode is the side-surface drawing mode (step S1002: SIDE-SURFACE), the setting unit 103 sets the two-dimensional normal vector Ni for the side surfaces (step S1005). The calculating unit 105 then calculates the modulation coefficients Kwi of the luminance for the side surfaces (step S1006).

Subsequently, it is determined whether the unprocessed two-dimensional vertex data P remain (step S1007), and if the unprocessed two-dimensional vertex data P remain (step S1007: YES), the process returns to step S1005. On the other hand, if no unprocessed two-dimensional vertex data P remain (step S1007: NO), the drawing unit 106 executes the drawing processing (step S1008).

Thus, according to the embodiment, since the common modulation coefficient Ku can be used for all the three-dimensional objects when the top surfaces are drawn, the drawing processing can be accelerated. When the side surfaces are drawn, the modulation coefficients Kwi are used for drawing the respective three-dimensional objects. As a result, a restricted three-dimensional object can be restored from two-dimensional data in the lighting processing of the three-dimensional graphics. Therefore, the calculation processing can be limited to the two-dimensional state, and the calculation amount can be reduced.

Figure 11:
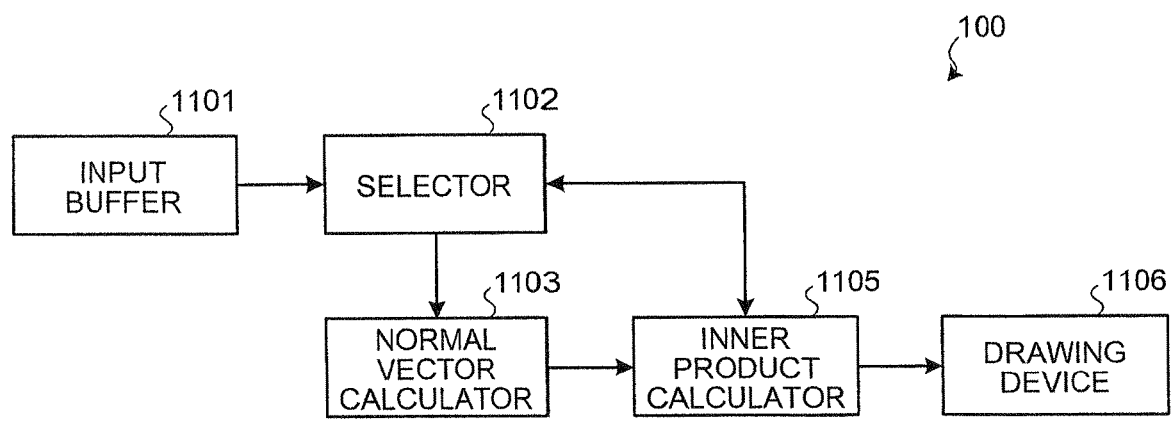
FIG. 11 is a block diagram of a hardware configuration of the three-dimensional graphic apparatus.

A first embodiment of the three-dimensional graphic apparatus 100 according to the embodiments is explained. FIG. 11 is a block diagram of a hardware configuration of the three-dimensional graphic apparatus 100. As shown in FIG. 11, the three-dimensional graphic apparatus 100 is a graphic LSI including an input buffer 1101, a selector 1102, a normal vector calculator 1103, an inner product calculator 1105, and a drawing device 1106.

The input buffer 1101 inputs a data stream of the two-dimensional vertex data. The input buffer 1101 corresponds to the input unit 101 shown in FIG. 1. The selector 1102 allocates the two-dimensional vertex data from the input buffer 1101 to the normal vector calculator 1103 or the inner product calculator 1105. The selector 1102 corresponds to the selecting unit 102 shown in FIG. 1.

The normal vector calculator 1103 reads the two-dimensional vertex data to calculate the two-dimensional normal vector. The normal vector calculator 1103 corresponds to the setting unit 103 and the determining unit 104 shown in FIG. 1. The inner product calculator 1105 calculates an inner product value of the two-dimensional normal vector and the light-source vector. The inner product calculator 1105 corresponds to the calculating unit 105 shown in FIG. 1. The drawing device 1106, using the two-dimensional vertex data and the H-direction height data, executes the drawing processing such as the push-out processing in the H-direction, the lighting processing using the inner product value calculated by the inner product calculator 1105, the projective transformation, and the hidden surface removal processing. The drawing device 1106 corresponds to the drawing unit 106 shown in FIG. 1.

Figure 12:
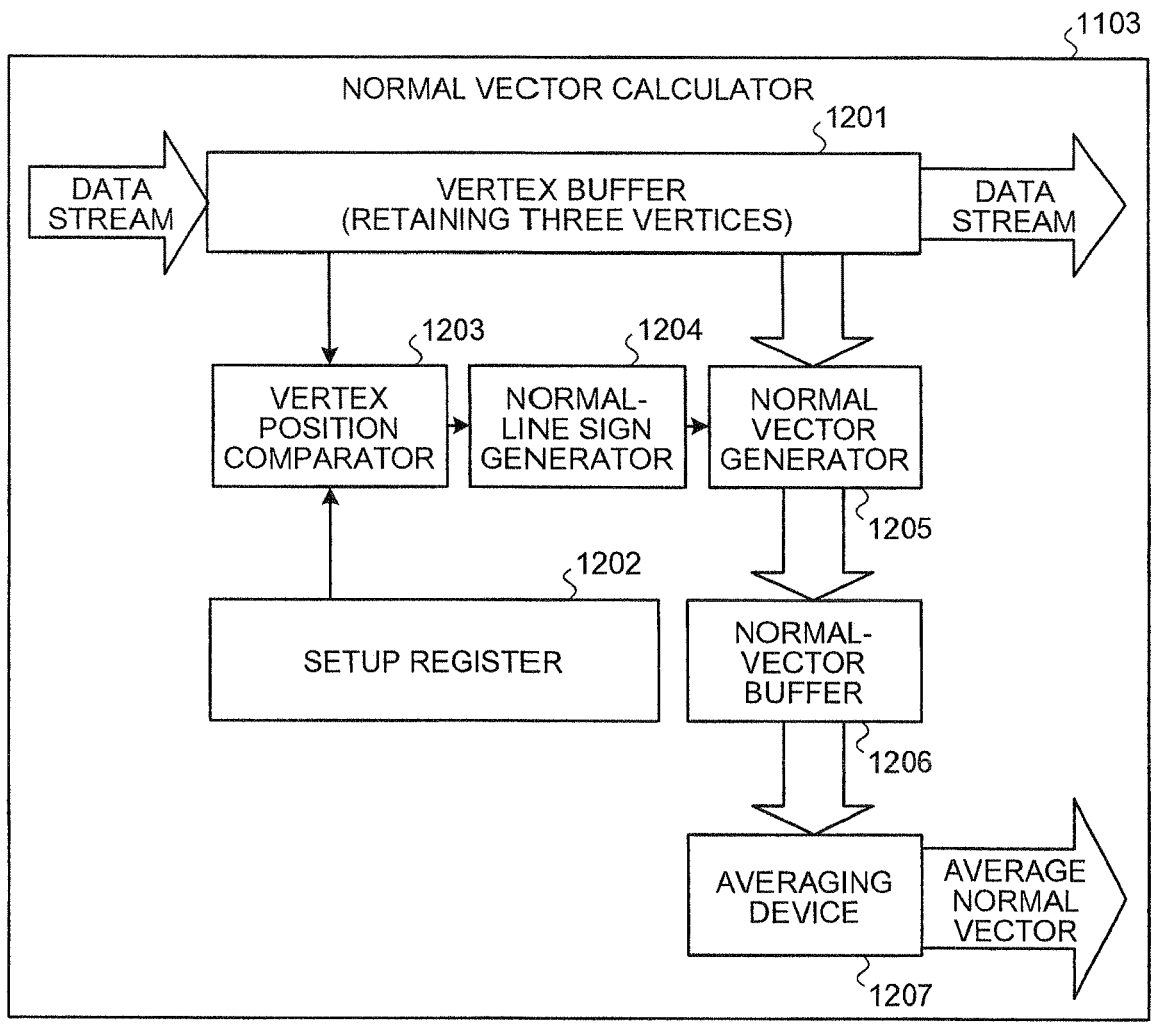
FIG. 12 is a block diagram of an example of a hardware configuration of a normal vector calculator.

An example of a hardware configuration of the normal vector calculator 1103 is explained. FIG. 12 is a block diagram of an example of a hardware configuration of the normal vector calculator 1103. The normal vector calculator 1103 shown in FIG. 12 is a configuration for performing the above smoothing of the lighting processing. As shown in FIG. 12, the normal vector calculator 1103 includes a vertex buffer 1201, a setup register 1202, a vertex position comparator 1203, a normal-line sign generator 1204, a normal-vector generator 1205, a normal-vector buffer 1206, and an averaging device 1207.

The vertex buffer 1201 retains three successively input vertex data from the data stream of the two-dimensional vertex data. In the setup register 1202, the arrangement order is set such as clockwise rotation or counterclockwise rotation. The vertex position comparator 1203, referring to the setup register 1202, compares the left/right positions of three vertex data retained in the vertex buffer 1201. The normal-line sign generator 1204 generates a sign of a normal vector from the comparison result by the vertex position comparator 1203.

The normal-vector generator 1205, using successive two vertex data of the three vertex data retained in the vertex buffer 1201 and the sign from the normal-line sign generator 1204, generates a two-dimensional normal vector of a side linking the two vertex data. The normal-vector buffer 1206 retains two-dimensional normal vectors generated by the normal-vector generator 1205. The averaging device 1207 calculates the average normal vector Nij obtained by averaging the two two-dimensional normal vectors Ni and Nj retained in the normal-vector buffer 1206.

One average normal vector Nij is defined for each of vertex data. Therefore, the vertex buffer 1201 adjusts the output delay of the data stream for synchronization with the corresponding vertex output. According to this configuration, the lighting color can be smoothed, and the realistic curved surface drawing of the three-dimensional objects can be implemented through simple lighting calculation processing by the graphic LSI.

Figure 13:
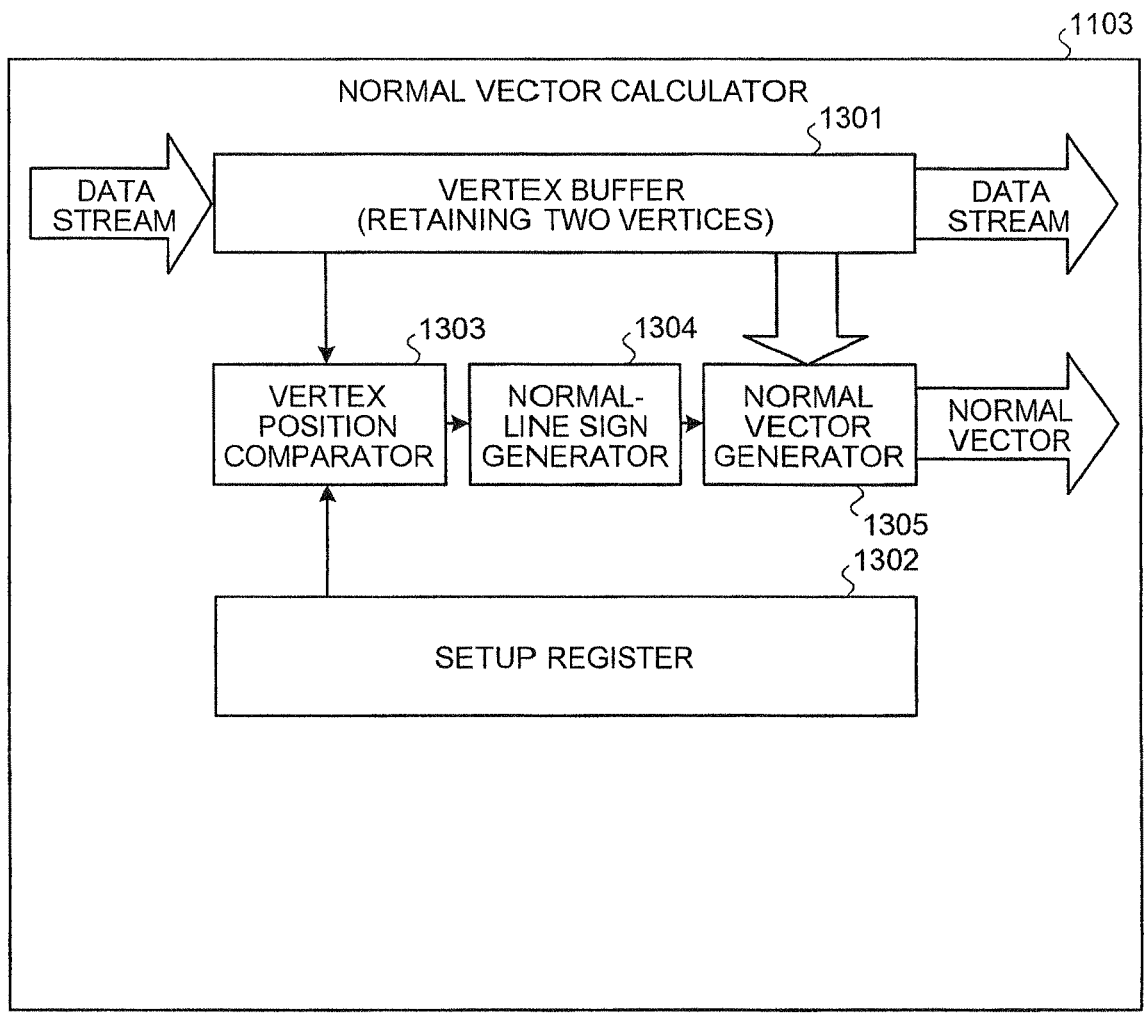
FIG. 13 is a block diagram of another example of a hardware configuration of the normal vector calculator.

Another example of the normal vector calculator 1103 is explained. FIG. 13 is a block diagram of another example of a hardware configuration of the normal vector calculator 1103. As shown in FIG. 13, the normal vector calculator 1103 includes a vertex buffer 1301, a setup register 1302, a vertex position comparator 1303, a normal-line sign generator 1304, and a normal-vector generator 1305.

The vertex buffer 1301 retains two successively input vertex data from the data stream of the two-dimensional vertex data. In the setup register 1302, the arrangement order is set such as clockwise rotation or counterclockwise rotation. The vertex position comparator 1303, referring to the setup register 1302, compares the left/right positions of two vertex data retained in the vertex buffer 1301. The normal-line sign generator 1304 generates a sign of a normal vector from the comparison result of the vertex position comparator 1303.

The normal-vector generator 1305, using the two vertex data retained in the vertex buffer 1301 and the sign from the normal-line sign generator 1304, generates a two-dimensional normal vector of a side linking the two vertex data. According to this configuration, the two dimensional normal vector linking the two vertex data can be set so as to face outward from the three dimensional object.

Figure 14:
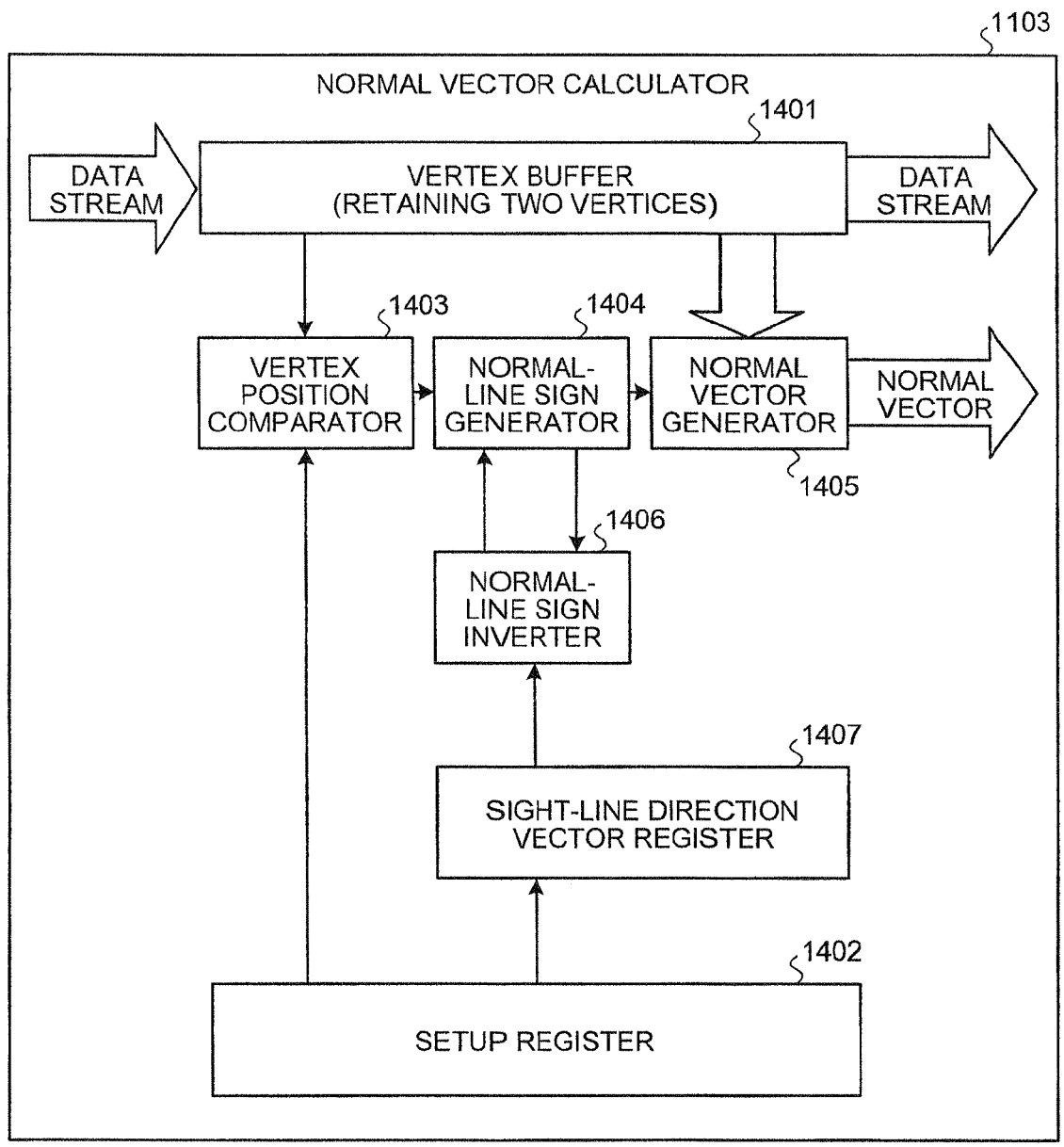
FIG. 14 is a block diagram of another example of a hardware configuration of the normal vector calculator.

Another example of the normal vector calculator 1103 is explained. FIG. 14 is a block diagram of another example of a hardware configuration of the normal vector calculator 1103. As shown in FIG. 14, the normal vector calculator 1103 includes a vertex buffer 1401, a setup register 1402, a vertex position comparator 1403, a normal-line sign generator 1404, a normal-vector generator 1405, and a normal-line sign inverter 1406, and a sight-line direction vector register 1407.

The vertex buffer 1401 retains two successively input vertex data from the data stream of the two-dimensional vertex data. The vertex position comparator 1403, referring to the setup register 1402, compares the left/right positions of two vertex data retained in the vertex buffer 1401. In the setup register 1402, the arrangement order is set such as clockwise rotation or counterclockwise rotation. The normal-line sign generator 1404 generates a sign of a normal vector from the comparison result of the vertex position comparator 1403.

The normal-line sign inverter 1406, referring to the sight-line direction vector retained in the sight-line direction vector register 1407, inverts the sign of the normal line such that the side surface of the three-dimensional object becomes opposed to the sight-line direction. The normal-vector generator 1405, using two vertex data retained in the vertex buffer 1401 and the sign from the normal-line sign generator 1404, generates a two-dimensional normal vector of a side linking the two vertex data. According to this configuration, the direction setup can be performed for a two-dimensional normal vector of a side linking the two vertex data. In this case, the drawing device 1106, using the hidden surface removal method, can perform the drawing subjected to the lighting processing.

Figure 15:
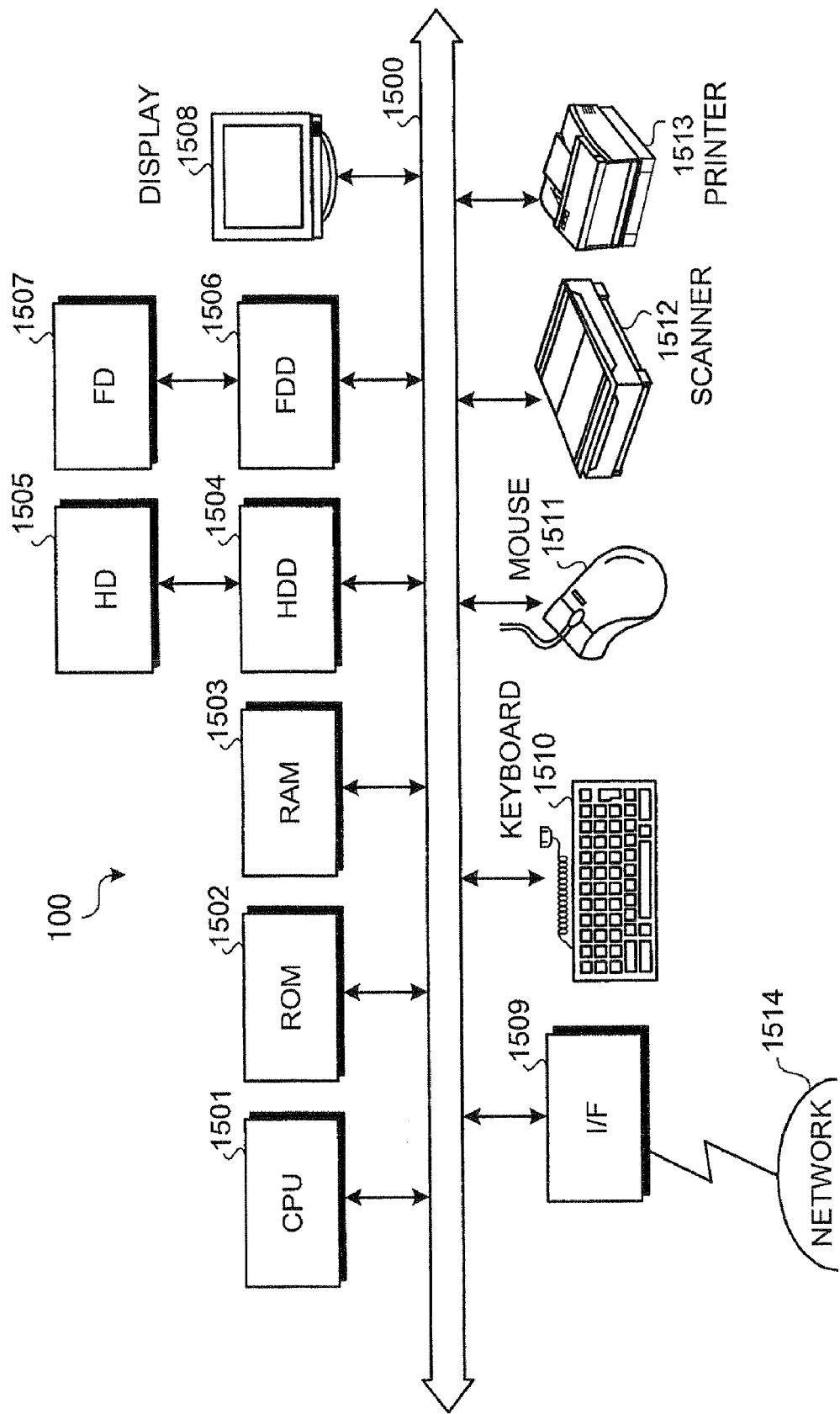
FIG. 15 is a block diagram of a hardware configuration of the three-dimensional graphic apparatus according to the second embodiment.

A second embodiment of the three-dimensional graphic apparatus 100 according to the embodiments is explained. FIG. 15 is a block diagram of a hardware configuration of the three-dimensional graphic apparatus 100 according to the second embodiment. As shown in FIG. 15, the three-dimensional graphic apparatus 100 includes a central processing unit (CPU) 1501, a read only memory (ROM) 1502, a random access memory (RAM) 1503, a hard disc drive (HDD) 1504, a hard disc (HD) 1505, a flexible disc drive (FDD) 1506, a flexible disc (FD) 1507 that is an example of a detachable recording medium, a display 1508, an interface (I/F) 1509, a keyboard 1510, a mouse 1511, a scanner 1512, and a printer 1513. The constituent units are connected to each other through a bus 1500.

The CPU 1501 controls the entire three-dimensional graphic apparatus 100. The ROM 1502 stores programs such as a boot program. The RAM 1503 is used as a work area of the CPU 1501. The HDD 1504 controls reading/writing of data from/to the HD 1505 under the control of the CPU 1501. The HD 1505 stores thereon the data written under the control of the HDD 1504.

The FDD 1506 controls reading/writing of data from/to the FD 1507 under the control of the CPU 1501. The FD 1507 stores thereon the data written under the control of the FDD 1506, and causes the three-dimensional graphic apparatus 100 to read the data stored in the FD 1507.

The detachable recording medium may be a compact-disc read-only memory (CD-ROM) (compact disc recordable (CD-R), compact disc rewritable (CD-RW)), a magnet-optical disc (MO), a digital versatile disc (DVD), and a memory card, in addition to the FD 1507. The display 1508 displays a cursor, icons or tool boxes as well as data such as documents, images, and function information. This display 1508 may be a cathode-ray tube (CRT), a thin-film transistor (TFT) liquid crystal display, and a plasma display, for example.

The I/F 1509 is connected via a communication line to the network 1514 such as the Internet, and is connected to other apparatuses via this network 1514. The I/F 1509 is an interface between the network 1514 and the inside of the apparatus, and controls input/output of data from/to an external apparatus. The I/F 1509 may be a modem and a LAN adaptor, for example.

The keyboard 1510 includes keys for inputting characters, numeric characters, various instructions, etc., to input data. A touch-panel type input pad, a numeric keypad, etc., may be used instead. The mouse 1511 moves a cursor, selects an area, or moves and resizes a window, etc. A trackball or joystick may be used instead, as long as similar functions as a pointing device are included.

The scanner 1512 optically reads an image, and captures image data into the three-dimensional graphic apparatus 100. The scanner 1512 may have an OCR function. The printer 1513 prints image data and document data. The printer 1513 may be a laser printer or an ink-jet printer, for example.

Thus, according to the second embodiment, the functions of the units 101 to 1506 included in the three-dimensional graphic apparatus 100 shown in FIG. 1 can be performed with the three-dimensional graphic program recorded in the ROM 1502 in the three-dimensional graphic process (steps S1001 to S1008) shown in FIG. 10.

Therefore, since the common modulation coefficient Ku can be used for all the three-dimensional objects when the top surfaces are drawn, the drawing processing can be accelerated with software. When the side surfaces are drawn, the modulation coefficients Kwi are used for drawing the respective three-dimensional objects. As a result, a restricted three-dimensional object can be restored with software from two-dimensional data in the lighting processing of the three-dimensional graphics. Therefore, the calculation processing can be limited to the two-dimensional state, and the calculation amount can be reduced.

As explained above, according to the embodiments, the drawing processing accompanied by the lighting processing can be accelerated and the load of graphic LSI and CPU can be alleviated.

As explained above, the embodiment is suitable for three-dimensional graphics stretching building structure coordinates (two-dimensional vertex data) of two-dimensional map data in the H-direction (height direction) to draw a three-dimensional building structure shape.

Although the embodiment has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A graphic apparatus that draws an object three-dimensionally using a level plane and a height-axis perpendicular to the level plane, comprising:
    a receiving unit that receives first vertex data identifying a position of a first top surface of a first object on the level plane and second vertex data identifying a position of a second top surface of a second object on the level plane, wherein the first vertex data is different from the second vertex data;
    a calculating unit that calculates a modulation coefficient of luminance for the first top surface based on a normal vector for the first top surface and a light-source vector indicating a direction of a light source on the level plane; and a drawing unit that draws the first top surface using the first vertex data and the modulation coefficient, and the second top surface of the second object using the second vertex data and the modulation coefficient.

2. The graphic apparatus according to claim 1, further comprising:

a setting unit that sets normal vectors on the level plane respectively for side surfaces of the object based on the vertex data.

3. The graphic apparatus according to claim 2, wherein the setting unit, based on the normal vectors respectively for two adjacent side surfaces of the object, sets a normal vector on the level plane for a ridge line between the adjacent side surfaces, the calculating unit calculates a modulation coefficient of luminance for the adjacent side surfaces based on the normal vector for the ridge line, and the drawing unit draws the adjacent side surfaces using the vertex data and the modulation coefficient of luminance for the adjacent side surfaces.

4. The graphic apparatus according to claim 2, further comprising a determining unit that determines, based on two pieces of vertex data identifying a side surface and a sight-line vector indicating a direction of a sight line on the level plane, whether the side surface is opposed to the direction of the sight line, wherein the calculating unit calculates a modulation coefficient of luminance for the side surface based on a determination result by the determining unit.

5. The graphic apparatus according to claim 4, wherein the determining unit determines whether the side surface is opposed to the direction of the sight line based on a sign of an inner product of a normal vector for the side surface and the sight-line vector.

6. The graphic apparatus according to claim 4, wherein the drawing unit draws the side surface with a hidden surface removal method.

7. The graphic apparatus according to claim 2, wherein the setting unit, based on the vertex data, sets the normal vectors to be opposed to a sight-line vector indicating a direction of a sight line on the level plane, and the drawing unit draws the side surfaces with a hidden surface removal method.

8. A graphic method of drawing an object three-dimensionally using a level plane and a height-axis perpendicular to the level plane, comprising:

receiving, by at least one processor, first vertex data identifying a position of a first top surface of a first object on the level plane and second vertex data identifying a position of a second top surface of a second object on the level plane, wherein the first vertex data is different from the second vertex data;

calculating a modulation coefficient of luminance for the first top surface based on a normal vector for the first top surface and a light-source vector indicating a direction of a light source on the level plane; and drawing the first top surface using the first vertex data and the modulation coefficient, and the second top surface of the second object using the second vertex data and the modulation coefficient.

9. The graphic method plane according to claim 8, further comprising:

setting normal vectors on the level plane respectively for side surfaces of the object based on the vertex data.

10. A non-transitory recording medium that stores therein a graphic program for drawing an object three-dimensionally using a level plane and a height-axis perpendicular to the level plane, the graphic program causing a computer to execute:

receiving first vertex data identifying a position of a first top surface of a first object on the level plane and second vertex data identifying a position of a second top surface of a second object on the level plane wherein, the first vertex data is different from the second vertex data;

calculating a modulation coefficient of luminance for the first top surface based on a normal vector for the first top surface and a light-source vector indicating a direction of a light source on the level plane; and drawing the first top surface using the first vertex data and the modulation coefficient, and the second top surface of the second object using the second vertex data and the modulation coefficient.

11. The non-transitory recording medium according to claim 10, the graphic program causing a computer to execute:

setting normal vectors on the level plane respectively for side surfaces of the object based on the vertex data.

* * * * *